(12) United States Patent
Chen et al.

(10) Patent No.: US 8,401,326 B2
(45) Date of Patent: Mar. 19, 2013

(54) IMAGE PROCESSING SYSTEM AND METHOD FOR LIQUID CRYSTAL DISPLAY

(75) Inventors: Yen-Lin Chen, Sindian (TW); Yuan-Chih Peng, Taipei (TW)

(73) Assignee: Sunplus Technology Co., Ltd. (TW)

( * ) Notice: Subject to any disclaimer, the term of this patent is extended or adjusted under 35 U.S.C. 154(b) by 1321 days.

(21) Appl. No.: 12/155,587

(22) Filed: Jun. 6, 2008

(65) Prior Publication Data

US 2009/0226110 A1     Sep. 10, 2009

(30) Foreign Application Priority Data

Mar. 6, 2008 (TW) ................ 97107850 A

(51) Int. Cl.
*G06K 9/40* (2006.01)
(52) U.S. Cl. ...................................... 382/260
(58) Field of Classification Search ............ 348/352, 348/353, 354; 358/3.27; 382/254, 260, 263, 382/264, 274
See application file for complete search history.

(56) References Cited

FOREIGN PATENT DOCUMENTS

| JP | 2002-351382 | 12/2002 |
|---|---|---|
| JP | 2002351382 A | * 12/2002 |

* cited by examiner

*Primary Examiner* — Gregory F Cunningham
(74) *Attorney, Agent, or Firm* — Bacon & Thomas, PLLC

(57) ABSTRACT

In an image processing system for a liquid crystal display a frame converter receives an original frame signal and produces a double frequency frame signal. A high pass filter performs a high pass filtering on the double frequency frame signal and produces a high pass double frequency frame signal. A delay device performs a delay operation on the double frequency frame signal and produces a delayed double frequency frame signal. A local contrast measurement device measures a contrast of the double frame signal and produces a local contrast signal. A high frequency gain device performs a gain adjustment on the high pass double frequency frame signal based on the local contrast signal and produces a gained high pass double frequency frame signal. A mixer is employed to mix the gained high pass double frequency frame signal and the delayed double frequency frame signal and produce an output frame signal.

12 Claims, 7 Drawing Sheets

| s1 | | 1 | | 2 | | 3 | | 4 | | 5 |
|---|---|---|---|---|---|---|---|---|---|---|
| s2 | 1 | 1 | 2 | 2 | 3 | 3 | 4 | 4 | 5 | 5 |
| s2L | s2L1 | s2L1 | s2L2 | s2L2 | s2L3 | s2L3 | s2L4 | s2L4 | s2L5 | s2L5 |
| s2H | s2H1 | s2H1 | s2H2 | s2H2 | s2H3 | s2H3 | s2H4 | s2H4 | s2H5 | s2H5 |
| s_out/s-out' | s_out1 | s_out1 | s_out2 | s_out2 | s_out3 | s_out3 | s_out4 | s_out4 | s_out5 | s_out5 |
| Motion | H.F. Gain=0.5 | H.F. Gain=1.5 | H.F. Gain=0.5 | H.F. Gain=1.5 | H.F. Gain=0.5 | H.F. Gain=1.5 | H.F. Gain=0.5 | H.F. Gain=1.5 | H.F. Gain=0.5 | H.F. Gain=1.5 |
| | H.F. Gain=1 | H.F. Gain=1 | H.F. Gain=1 | H.F. Gain=1 | H.F. Gain=1 | H.F. Gain=1 | H.F. Gain=1 | H.F. Gain=1 | H.F. Gain=1 | H.F. Gain=1 |
| No Motion | L.F. gain=1 | L.F. Gain=1 | L.F. gain=1 | L.F. Gain=1 | L.F. gain=1 | L.F. Gain=1 | L.F. gain=1 | L.F. Gain=1 | L.F. gain=1 | L.F. Gain=1 |

FIG. 2

IMAGE PROCESSING SYSTEM AND METHOD FOR LIQUID CRYSTAL DISPLAY

BACKGROUND OF THE INVENTION

1. Field of the Invention

The present invention relates to the technical field of image processing and, more particularly, to an image processing system and method for a liquid crystal display (LCD).

2. Description of Related Art

In order to improve motion blur caused by the continuous lighting on an LCD screen, a conventional technique places a black or gray screen to provide the black or gray image between the original images to thereby simulate the pulse display feature of a CRT TV and reduce the motion blur on human eyes due to the persistence of vision. However, the image quality is reduced because the entire image brightness becomes darker and the frame flicker occurs when the black images are interlaced to the output images.

To overcome this problem, a Japanese patent publication number JP2002-351382 proposes a technique to convert an original frame signal into a double frequency frame output signal which has one frame for a low frequency output signal and the other frame for a high frequency output signal, and use a motion detector to detect an object motion vector for determining the gains of the low and high frequency output signals. FIG. 1 is a block diagram of an image processing system of a typical LCD. As shown in FIG. 1, the system includes a frame converter 110, a low pass filter 120, a low frequency gain device 130, a high pass filter 140, a high frequency gain device 150, a mixer 160, a driver 170, a display panel 180 and a motion detector 190. The motion detector 190 detects the object motion vector of an input frame s1 for determining the respective gains of the gain devices 130 and 150.

FIG. 2 is a schematic diagram of a typical operation of FIG. 1. As shown in FIG. 2, when the motion detector 190 detects no object movement in the input frame s1, it sets the gains of the gain devices 130 and 150 to one, i.e.) s_out=s_out'=1×s2L+1×s2H. When the motion detector 190 detects an object movement in the input frame s1, it sets the gain of the gain device 150, which corresponds to the double frequency frame output signal, to 0.5 and 1.5 alternately, i.e., s_out=1×s2L+0.5×s2H and s_out'=1×s2L+1.5×s2H, thereby enhancing the high frequency component. Such a way can reduce the motion image residual effect on the LCD screen, but a smear effect may occur at the object edges of a high contrast image to thereby reduce the entire image quality. Therefore, it is desirable to provide an improved image processing system and method to mitigate and/or obviate the aforementioned problems.

SUMMARY OF THE INVENTION

The object of the present invention is to provide an image processing system for a liquid crystal display (LCD), which can reduce the motion image residual on an LCD screen and the smear occurred at the object edges of the high contrast image, thereby increasing the entire image quality.

According to one aspect of the invention, an image processing system for a liquid crystal display (LCD) is provided, which includes a frame converter, a high pass filter, a delay device, a local contrast measurement device, a high frequency gain device and a mixer. The frame converter receives an original frame signal and accordingly produces a double frequency frame signal. The high pass filter is connected to the frame converter in order to perform a high pass filtering on the double frequency frame signal and accordingly produce a high pass double frequency frame signal. The delay device is connected to the frame converter in order to perform a delay operation on the double frequency frame signal and accordingly produce a delayed double frequency frame signal. The local contrast measurement device is connected to the frame converter in order to measure a contrast of the double frame signal and accordingly produce a local contrast signal. The high frequency gain device is connected to the local contrast measurement device and the high pass filter in order to perform a gain adjustment on the high pass double frequency frame signal based on the local contrast signal and accordingly produce a gained high pass double frequency frame signal. The mixer is connected to the high frequency gain device and the delay device in order to mix the gained high pass double frequency frame signal and the delayed double frequency frame signal and accordingly produce an output frame signal.

According to another aspect of the invention, an image processing method for a liquid crystal display (LCD) is provided, which includes: receiving an original frame signal to accordingly produce a double frequency frame signal; performing a high pass filtering on the double frequency frame to accordingly produce a high pass double frequency frame signal; performing a delay operation on the double frequency frame signal to accordingly produce a delayed double frequency frame signal; measuring a contrast of the double frame signal to accordingly produce a local contrast signal; performing a gain adjustment on the high pass double frequency frame signal based on the local contrast signal to accordingly produce a gained high pass double frequency frame signal; and mixing the gained high pass double frequency frame signal and the delayed double frequency frame signal to accordingly produce an output frame signal.

Other objects, advantages, and novel features of the invention will become more apparent from the following detailed description when taken in conjunction with the accompanying drawings.

BRIEF DESCRIPTION OF THE DRAWINGS

FIG. 2 shows a schematic diagram of a typical operation of FIG. 1;

DETAILED DESCRIPTION OF THE PREFERRED EMBODIMENT

Figure 1:
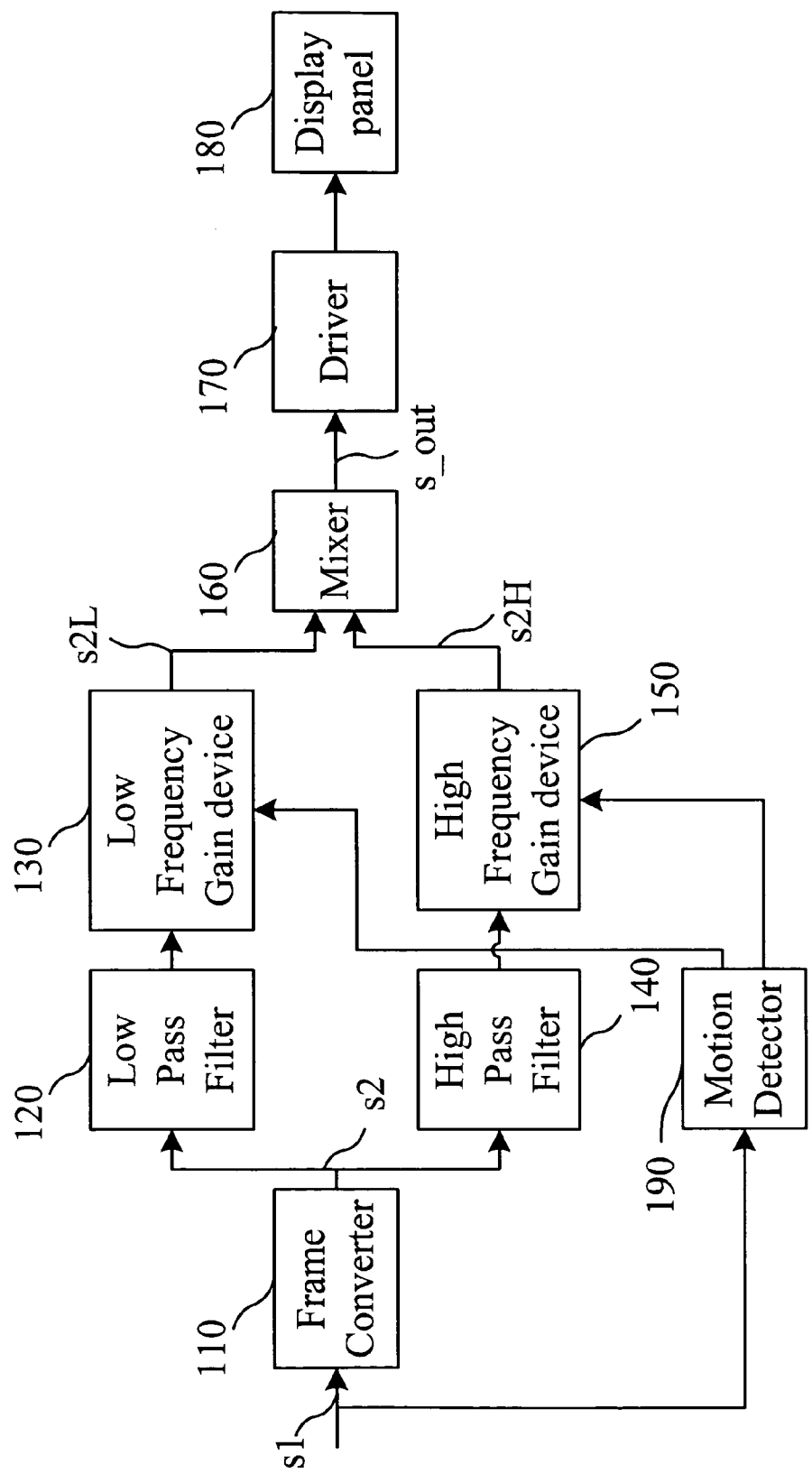
FIG. 1 is a block diagram of an image processing system of a typical LCD.
Figure 3:
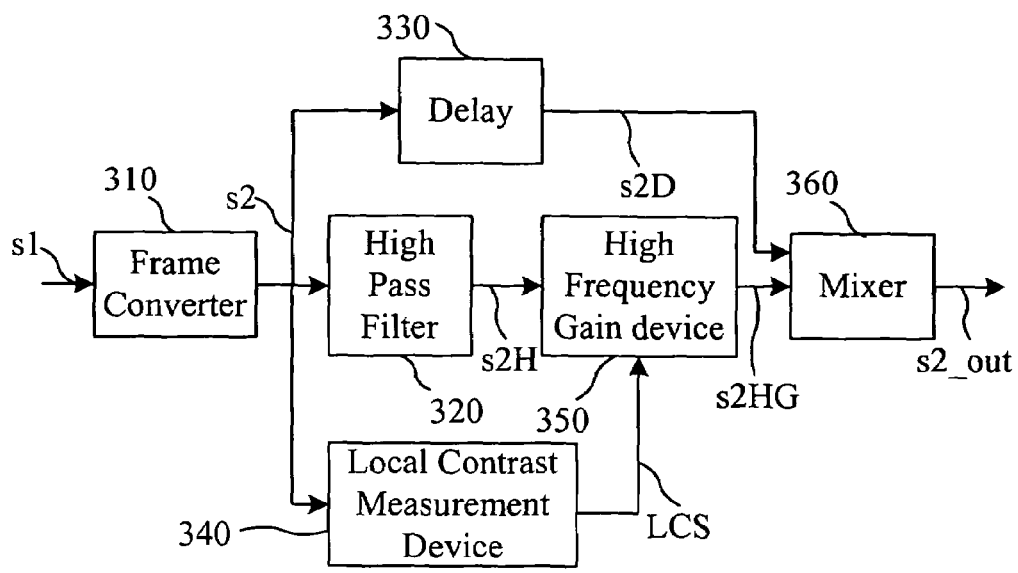
FIG. 3 is a block diagram of an image processing system for a liquid crystal display (LCD) according to an embodiment of the invention.

FIG. 3 is a block diagram of an image processing system for a liquid crystal display (LCD). In FIG. 3, the system includes a frame converter 310, a high pass filter 320, a delay device 330, a local contrast measurement device 340, a high frequency gain device 350 and a mixer 360.

The frame converter 310 receives an original frame signal s1 and accordingly produces a double frequency frame signal s2. If the original frame signal s1 is of 60 Hz, the double frequency frame signal s2 is of 120 Hz after conversion of the frame converter 310, and the same input frame is output twice.

The high pass filter (HPF) 320 is connected to the frame converter 310 in order to perform a high pass filtering on the double frequency frame signal s2 and accordingly produce a high pass double frequency frame signal s2H. The HPF 320 can be an HPF with a filtering factor of [−1 0 2 0 −1].

The delay device 330 is connected to the frame converter 310 in order to perform a delay operation on the double frequency frame signal s2 and accordingly produce a delayed double frequency frame signal s2D.

The local contrast measurement device 340 is connected to the frame converter 310 in order to measure a contrast of the double frame signal s2 and accordingly produce a local contrast signal (LCS). The local contrast measurement device 340 computes the local contrasts of pixels corresponding to the double frame signal s2. The local contrast measurement device 340 can be a steepness filter with 2N+1 points, where N is a positive integer. Namely, the local contrast measurement device 340 has a filtering factor of [−1 ... −1 0 1 ... 1], wherein there are N coefficients of −1 and N coefficients of 1.

The high frequency gain device 350 is connected to the local contrast measurement device 340 and the high pass filter 320 in order to perform a gain adjustment on the high pass double frequency frame signal s2H based on the local contrast signal LCS and accordingly produce a gained high pass double frequency frame signal s2HG. The high frequency gain device 350 performs the gain adjustment by multiplying the high pass double frequency frame signal s2H by a high frequency gain to accordingly produce the gained high pass double frequency frame signal s2HG.

Figure 4:
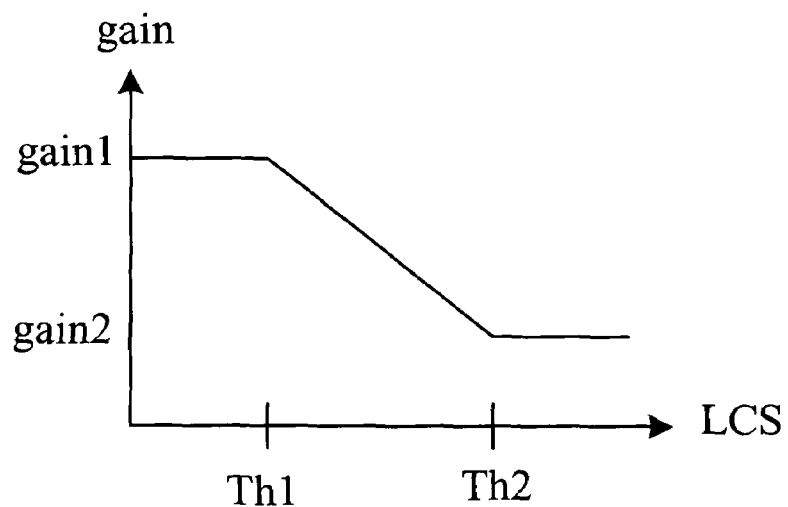
FIG. 4 is a graph of a relation of a high frequency gain of a high frequency gain device and a local contrast signal of a local contrast measurement device according to an embodiment of the invention.

FIG. 4 is a graph showing the relation between the high frequency gain of the high frequency gain device 350 and the local contrast signal of the local contrast measurement device 340. When the local contrast signal LCS is smaller than a first threshold Th1, the high frequency gain is a first predetermined value gain1. When the local contrast signal LCS is greater than a second threshold Th2, the high frequency gain is a second predetermined value gain2 smaller than the first predetermined value gain1. When the local contrast signal LCS is between the first threshold Th1 and the second threshold Th2, the high frequency gain is decreasing linearly.

The mixer 360 is connected to the high frequency gain device 350 and the delay device 330 in order to mix the gained high pass double frequency frame signal s2HG and the delayed double frequency frame signal s2D and accordingly produce an output frame signal s2_out.

Figure 5:
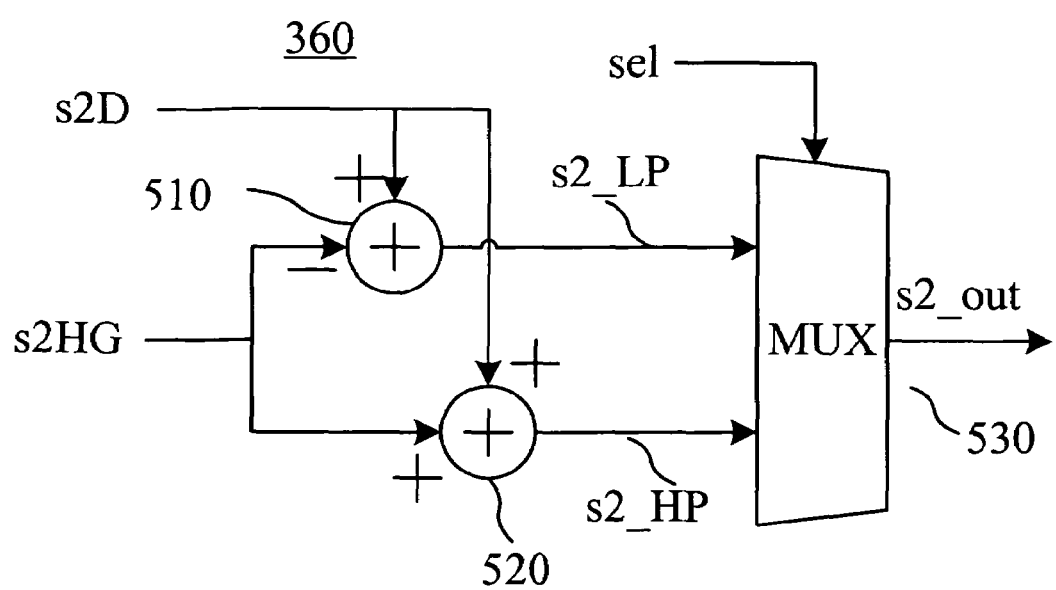
FIG. 5 is a circuit diagram of a mixer according to an embodiment of the invention.

FIG. 5 is a circuit diagram of the mixer 360. The mixer 360 includes a first adder 510, a second adder 520 and a multiplexer 530.

The first adder 510 has a first input terminal connected to the delay device 330 and a second input terminal connected to the high frequency gain device 350 in order to subtract the gained high pass double frequency frame signal s2HG from the delayed double frequency frame signal s2D and accordingly produce a low pass double frequency frame signal s2_LP.

The second adder 520 has a first input terminal connected to the delay device 330 and a second input terminal connected to the high frequency gain device 350 in order to add the gained high pass double frequency frame signal s2HG and the delayed double frequency frame signal s2D and accordingly produce a high pass double frequency frame signal s2_HP.

The multiplexer 530 is connected to the first adder 510 and the second adder 520 in order to select the low pass double frequency frame signal s2_LP or the high pass double frequency frame signal s2_HP for use as the output frame signal s2_out based on a select signal se1. The select signal se1 is a square signal with a frequency double to the input signal s1.

The invention uses the frame converter 310, the high pass filter 320, the local contrast measurement device 340, the high frequency gain device 350 and the mixer 360 to dynamically adjust the output frame images so that the motion blur appeared on the LCD screen is improved by adjusting the sharpness of the output frame images.

The frame converter 310 can convert the frame signal s1 with a frequency into the frame signal s2 with a frequency double to the signal s1. The high pass filter 320 can extract the high frequency image component out from the frame. The local contrast measurement device 340 can compute the local contrasts of each pixel of the frame. The high frequency gain device 350 can dynamically adjust the gain of the high frequency image component based on the local contrasts of each pixel of the frame. The mixer 360 can mix the original frame signal s2D and the high frequency signal s2HG computed by the high frequency gain device 350. Namely, the invention increases the output frequency and alternately outputs the output signal with high frequency images and the output signal with low frequency images. Accordingly, the reduced brightness and the flicker on the frames caused by the interlaced black images are avoided. In addition, the high frequency gain is dynamically adjusted with the local contrast of each pixel to thereby avoid the smear occurred at the edges of a high contrast image object when the high and low frequency images are alternately output.

Figure 6:
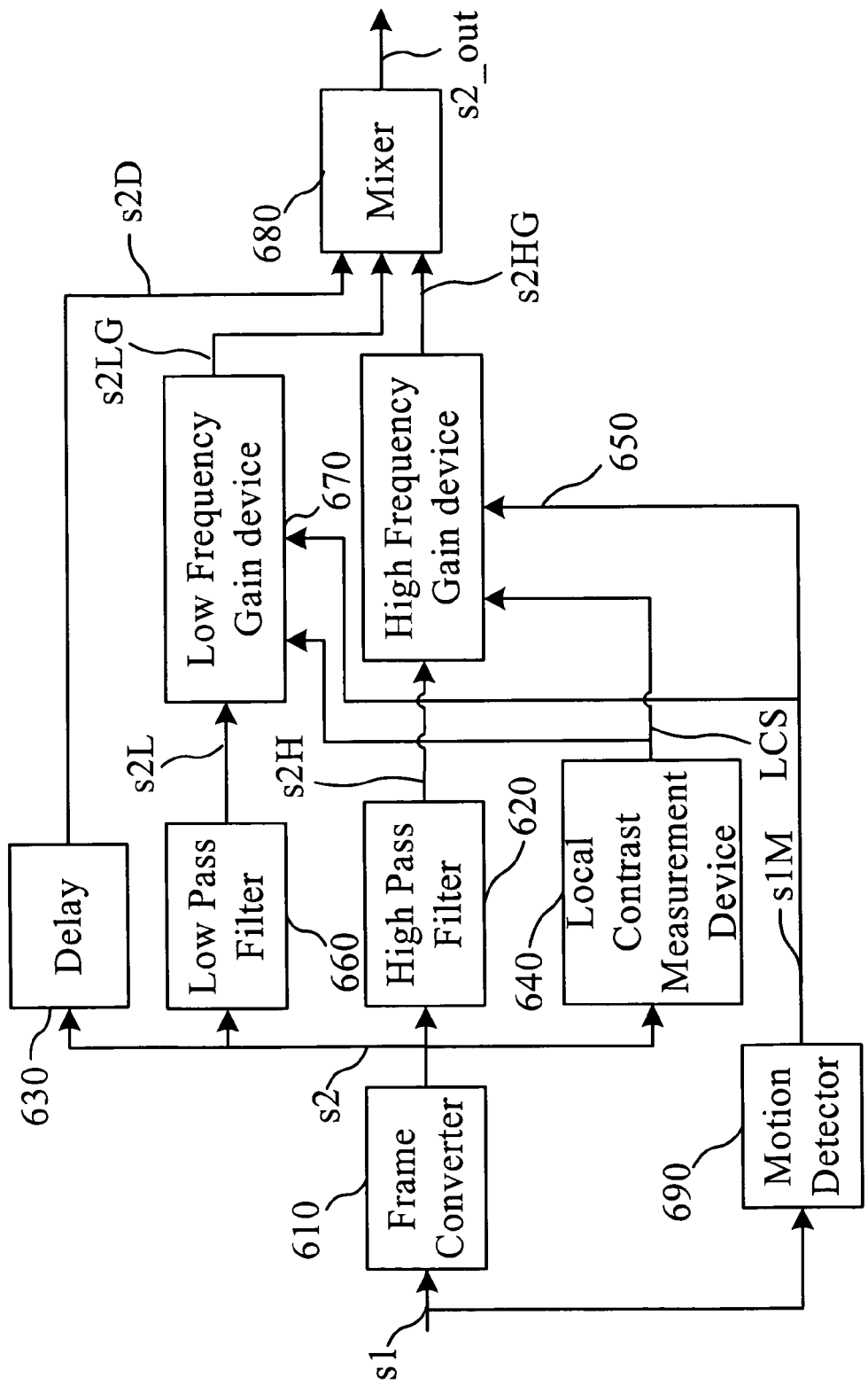
FIG. 6 is a block diagram of an image processing system for a liquid crystal display (LCD) according to another embodiment of the invention.

FIG. 6 is a block diagram of an image processing system for a liquid crystal display (LCD) according to another embodiment of the invention. In FIG. 6, the system includes a frame converter 610, a high pass filter 620, a delay device 630, a local contrast measurement device 640, a high frequency gain device 650, a low pass filter 660, a low frequency gain device 670, a mixer 680 and a motion detector 690.

The frame converter 610 receives an original frame signal s1 and accordingly produces a double frequency frame signal s2.

The high pass filter 620 is connected to the frame converter 610 in order to perform a high pass filtering on the double frequency frame signal s2 and accordingly produce a high pass double frequency frame signal s2H.

The delay device 630 is connected to the frame converter 610 in order to perform a delay operation on the double frequency frame signal s2 and accordingly produce a delayed double frequency frame signal s2D.

The local contrast measurement device 640 is connected to the frame converter 610 in order to measure a contrast of the double frame signal s2 and accordingly produce a local contrast signal (LCS). The local contrast measurement device 640 computes the local contrasts of pixels corresponding to the double frame signal s2. The local contrast measurement device 640 can be a steepness filter with 2N+1 points, where N is a positive integer. Namely, the local contrast measurement device 640 has a filtering factor of [−1 ... −1 0 1 ... 1], where the number is N for −1 and 1 respectively.

Figure 7:
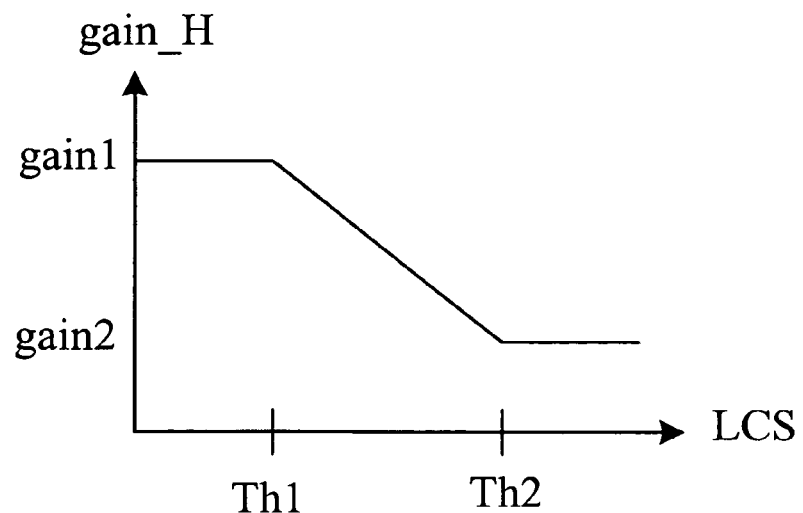
FIG. 7 is a graph of a relation of a high frequency gain of a high frequency gain device and a local contrast signal block of a local contrast measurement device according to another embodiment of the invention.

The high frequency gain device 650 is connected to the local contrast measurement device 640 and the high pass filter 620 in order to perform a gain adjustment on the high pass double frequency frame signal s2H based on the local contrast signal LCS and accordingly produce a gained high pass double frequency frame signal s2HG. The high frequency gain device 650 performs the gain adjustment by multiplying the high pass double frequency frame signal s2H by a high frequency gain gain_H to accordingly produce the gained high pass double frequency frame signal s2HG FIG. 7 is a graph showing the relation between the high frequency gain gain_H and the local contrast signal LCS. When the local contrast signal LCS is smaller than a first threshold Th1, the high frequency gain gain_H is a first predetermined value gain1. When the local contrast signal LCS is greater than a second threshold Th2, the high frequency gain gain_H is a second predetermined value gain2 smaller than the first predetermined value gain1. When the local contrast signal LCS is between the first threshold Th1 and the second threshold Th2, the high frequency gain is decreasing linearly.

The low pass filter 660 is connected to the frame converter 610 in order to perform a low pass filtering on the double frequency frame signal s2 and accordingly produce a low pass double frequency frame signal s2L.

The low frequency gain device 670 is connected to the local contrast measurement device 640 and the low pass filter 660 in order to perform a gain adjustment on the low pass double frequency frame signal s2L based on the local contrast signal LCS and accordingly produce a gained low pass double frequency frame signal s2LG The low frequency gain device 670 performs the gain adjustment by multiplying the low pass double frequency frame signal s2L by a low frequency gain gain_L to accordingly produce the gained low pass double frequency frame signal s2LG.

Figure 8:
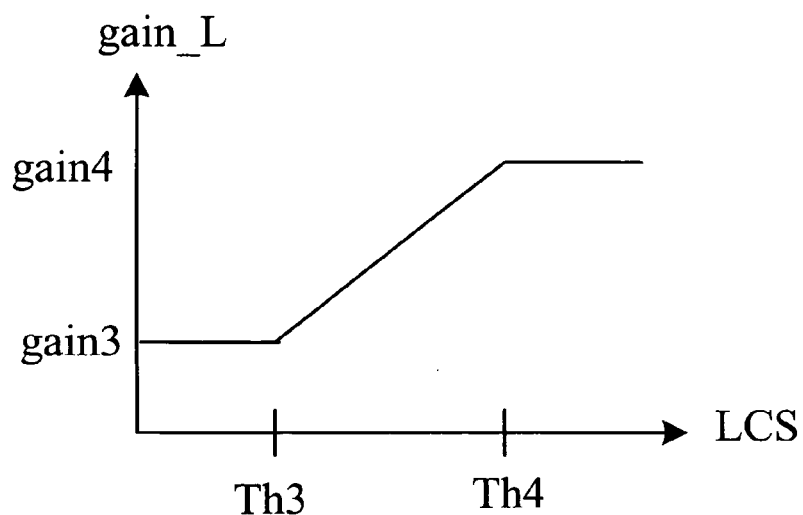
FIG. 8 is a graph of a relation of a low frequency gain of a low frequency gain device and a local contrast signal block of a local contrast measurement device according to another embodiment of the invention.

FIG. 8 is a graph showing the relation between the low frequency gain gain_L and the local contrast signal LCS. When the local contrast signal LCS is smaller than a third threshold Th3, the low frequency gain gain_L is a third predetermined value gain3. When the local contrast signal LCS is greater than a fourth threshold Th4, the low frequency gain gain_L is a fourth predetermined value gain4 greater than the third predetermined value gain3. When the local contrast signal LCS is between the third threshold Th3 and the fourth threshold Th4, the low frequency gain gain_L is increasing linearly.

The mixer 680 is connected to the high frequency gain device 650, the low frequency gain device 670 and the delay device 630 in order to mix the gained high pass double frequency frame signal s2HG and the delayed double frequency frame signal s2D to accordingly produce a high pass double frequency frame signal s2_HP, and to select the high pass double frequency frame signal s2_HP or the gained low pass double frequency frame signal s2LG as an output frame signal s2-out.

Figure 9:
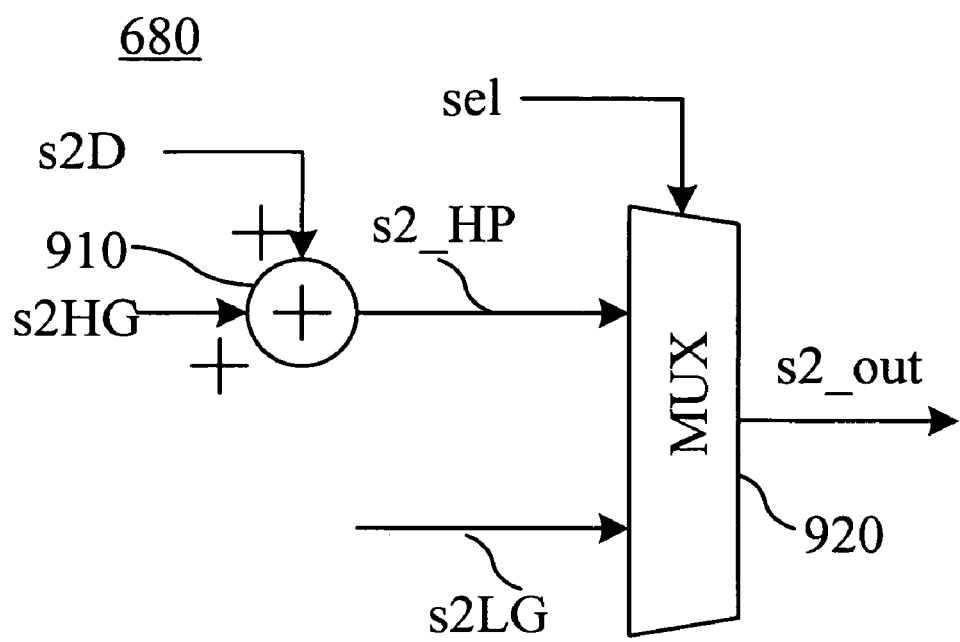
FIG. 9 is a circuit diagram of a mixer according to another embodiment of the invention.

FIG. 9 is a circuit diagram of the mixer 680. The mixer 680 includes a first adder 910 and a multiplexer 920.

The first adder 910 has a first input terminal connected to the delay device 630 and a second input terminal connected to the high frequency gain device 650 in order to add the delayed double frequency frame signal s2D and the gained high pass double frequency frame signal s2HG to accordingly produce a high pass double frequency frame signal s2_HP.

The multiplexer 920 is connected to the first adder 910 and the low frequency gain device 670 in order to select the high pass double frequency frame signal s2_HP or the gained low pass double frequency frame signal s2LG as the output frame signal s2_out based on a select signal se1. The select signal se1 is a square signal with a frequency double to the input signal s1.

The motion detector 690 receives the original frame signal s1 and is connected to the low frequency gain device 670 and the high frequency gain device 650 in order to detect whether the original frame signal s1 contains a motion and produce a motion signal s1M when the original frame signal s1 contains a motion. The high frequency gain device 650 and the low frequency gain device 670 correct the first to fourth thresholds Th1 to Th4 based on the motion signal s1M.

When the motion detector 690 outputs the motion signal s1M, the high frequency gain device 650 and the low frequency gain device 670 adjust the first to fourth thresholds Th1 to Th4 up. When the motion detector 690 does not output the motion signal s1M, the high frequency gain device 650 and the low frequency gain device 670 adjust the first to fourth thresholds Th1 to Th4 down.

As cited, the invention increases the output frequency and alternately outputs the output signal with high frequency images and the output signal with low frequency images. Accordingly, the reduced brightness and the flicker on the frames caused by the interlaced black images are avoided. In addition, the high frequency gain and the low frequency gain are dynamically adjusted with the local contrast LCS of each pixel and the motion signal s1M to thereby avoid the smear occurred at the edges of a high contrast image object when the high and low frequency images are alternately output.

Although the present invention has been explained in relation to its preferred embodiment, it is to be understood that many other possible modifications and variations can be made without departing from the spirit and scope of the invention as hereinafter claimed.

What is claimed is:

1. An image processing system for a liquid crystal display (LCD), comprising:
    a frame converter for receiving an original frame signal and accordingly producing a double frequency frame signal;
    a high pass filter connected to the frame converter for performing a high pass filtering on the double frequency frame signal and accordingly producing a high pass double frequency frame signal;
    a delay device connected to the frame converter for performing a delay operation on the double frequency frame signal and accordingly producing a delayed double frequency frame signal;
    a local contrast measurement device connected to the frame converter for measuring a contrast of the double frame signal and accordingly producing a local contrast signal;
    a high frequency gain device connected to the local contrast measurement device and the high pass filter for performing a gain adjustment on the high pass double frequency frame signal based on the local contrast signal and accordingly producing a gained high pass double frequency frame signal, in which the high frequency gain device performs the gain adjustment by multiplying the high pass double frequency frame signal by a high frequency gain to accordingly produce the gained high pass double frequency frame signal, wherein the high frequency gain is a first predetermined value when the local contrast signal is smaller than a first threshold, and the high frequency gain is a second predetermined value, which is smaller than the first predetermined value, when the local contrast signal is greater than a second threshold, otherwise the high frequency gain is decreasing linearly when the local contrast signal is between the first threshold and the second threshold; and a mixer connected to the high frequency gain device and the delay device for mixing the gained high pass double frequency frame signal and the delayed double frequency frame signal and accordingly producing an output frame signal, in which the mixer comprises:

a first adder having a first input terminal connected to the delay device and a second input terminal connected to the high frequency gain device for subtracting the gained high pass double frequency frame signal from the delayed double frequency frame signal and accordingly producing a low pass double frequency frame signal;

a second adder having a first input terminal connected to the delay device and a second input terminal connected to the high frequency gain device for adding the gained high pass double frequency frame signal and the delayed double frequency frame signal and accordingly producing a high pass double frequency frame signal; and a multiplexer connected to the first adder and the second adder for selecting the low pass double frequency frame signal or the high pass double frequency frame signal as the output frame signal based on a select signal.

2. The image processing system as claimed in claim 1, wherein the select signal is a square signal with a frequency double to the original frame signal.

3. An image processing method for an LCD, comprising the steps of:

receiving an original frame signal to accordingly produce a double frequency frame signal;

performing a high pass filtering on the double frequency frame to accordingly produce a high pass double frequency frame signal;

performing a delay operation on the double frequency frame signal to accordingly produce a delayed double frequency frame signal;

measuring a contrast of the double frame signal to accordingly produce a local contrast signal;

performing a gain adjustment on the high pass double frequency frame signal based on the local contrast signal to accordingly produce a gained high pass double frequency frame signal;

mixing the gained high pass double frequency frame signal and the delayed double frequency frame signal to accordingly produce an output frame signal;

performing a low pass filtering on the double frequency frame to accordingly produce a low pass double frequency frame signal;

performing a gain adjustment on the low pass double frequency frame signal based on the local contrast signal to accordingly produce a gained low pass double frequency frame signal;

mixing the gained high pass double frequency frame signal and the delayed double frequency frame signal to accordingly produce a high pass double frequency frame signal; and outputting the high pass double frequency frame signal or the gained low pass double frequency frame signal according to a select signal.

4. An image processing system for a liquid crystal display (LCD), comprising:

a frame converter for receiving an original frame signal and accordingly producing a double frequency frame signal;

a high pass filter connected to the frame converter for performing a high pass filtering on the double frequency frame signal and accordingly producing a high pass double frequency frame signal;

a delay device connected to the frame converter for performing a delay operation on the double frequency frame signal and accordingly producing a delayed double frequency frame signal;

a local contrast measurement device connected to the frame converter for measuring a contrast of the double frame signal and accordingly producing a local contrast signal;

a high frequency gain device connected to the local contrast measurement device and the high pass filter for performing a gain adjustment on the high pass double frequency frame signal based on the local contrast signal and accordingly producing a gained high pass double frequency frame signal, in which the high frequency gain device performs the gain adjustment by multiplying the high pass double frequency frame signal by a high frequency gain to accordingly produce the gained high pass double frequency frame signal, wherein the high frequency gain is a first predetermined value when the local contrast signal is smaller than a first threshold, and the high frequency gain is a second predetermined value, which is smaller than the first predetermined value, when the local contrast signal is greater than a second threshold, otherwise the high frequency gain is decreasing linearly when the local contrast signal is between the first threshold and the second threshold; and a mixer connected to the high frequency gain device and the delay device for mixing the gained high pass double frequency frame signal and the delayed double frequency frame signal and accordingly producing an output frame signal;

a low pass filter connected to the frame converter for performing a low pass filtering on the double frequency frame signal and accordingly producing a low pass double frequency frame signal; and a low frequency gain device connected to the local contrast measurement device, the low pass filter and the mixer for performing a gain adjustment on the low pass double frequency frame signal based on the local contrast signal and accordingly producing a gained low pass double frequency frame signal;

wherein the mixer mixes the gained high pass double frequency frame signal and the delayed double frequency frame signal to accordingly produce a high pass double frequency frame signal, and selects the high pass double frequency frame signal or the gained low pass double frequency frame signal as the output frame signal.

5. The image processing system as claimed in claim 4, wherein the low frequency gain device performs the gain adjustment by multiplying the low pass double frequency frame signal by a low frequency gain to accordingly produce the gained low pass double frequency frame signal.

6. The image processing system as claimed in claim 5, wherein the low frequency gain is a third predetermined value when the local contrast signal is smaller than a third threshold, and the low frequency gain is a fourth predetermined value, which is greater than the third predetermined value gain 1, when the local contrast signal is greater than a fourth threshold.

7. The image processing system as claimed in claim 6, wherein the low frequency gain is increasing linearly when the local contrast signal is between the third threshold and the fourth threshold.

8. The image processing system as claimed in claim 7, wherein the mixer comprises:
- a first adder having a first input terminal connected to the delay device and a second input terminal connected to the high frequency gain device for adding the delayed double frequency frame signal and the gained high pass double frequency frame signal to accordingly produce a high pass double frequency frame signal; and
- a multiplexer connected to the first adder and the low frequency gain device for selecting the high pass double frequency frame signal or the gained low pass double frequency frame signal as the output frame signal based on a select signal.

9. The image processing system as claimed in claim 8, wherein the select signal is a square signal with a frequency double to the original frame signal.

10. The image processing system as claimed in claim 9, further comprising:
- a motion detector connected to the low frequency gain device and the high frequency gain device for receiving the original frame signal and detecting whether the original frame signal contains a motion, so as to produce a motion signal when the original frame signal contains the motion, wherein the high frequency gain device and the low frequency gain device adjust the first to fourth thresholds based on the motion signal.

11. The image processing system as claimed in claim 10, wherein the high frequency gain device and the low frequency gain device adjust the first to fourth thresholds up when the motion detector outputs the motion signal.

12. The image processing system as claimed in claim 11, wherein the high frequency gain device and the low frequency gain device adjust the first to fourth thresholds down when the motion detector does not output the motion signal.

* * * * *